(12) United States Patent
Eisenhardt et al.

(10) Patent No.: US 10,207,346 B2
(45) Date of Patent: Feb. 19, 2019

(54) PIPE MILLING MACHINE—FEED DEACTIVATION

(71) Applicant: C. & E. Fein GmbH, Schwaebisch Gmuend (DE)

(72) Inventors: Armin Eisenhardt, Bisingen (DE); Boris Richt, Hemmingen (DE)

(73) Assignee: C & E Fein GmbH, Schwaebisch Gmuend (DE)

( * ) Notice: Subject to any disclaimer, the term of this patent is extended or adjusted under 35 U.S.C. 154(b) by 22 days.

(21) Appl. No.: 15/585,739

(22) Filed: May 3, 2017

(65) Prior Publication Data

US 2017/0320147 A1 Nov. 9, 2017

(30) Foreign Application Priority Data

May 3, 2016 (DE) .......................... 10 2016 108 219

(51) Int. Cl.
  *B23D 21/04* (2006.01)
  *B23D 45/12* (2006.01)
  *B23C 3/00* (2006.01)

(52) U.S. Cl.
  CPC ............ *B23D 45/126* (2013.01); *B23C 3/007* (2013.01); *B23D 21/04* (2013.01); *B23C 2220/12* (2013.01); *B23C 2255/08* (2013.01)

(58) Field of Classification Search
  CPC ........... B23C 3/122; B23C 3/34; B23C 3/007; B23C 2220/12; B23D 21/04; B23D 45/126
  USPC ..... 30/95, 97, 101, 102; 82/59, 70.2, 67, 69, 82/72, 74
  See application file for complete search history.

(56) References Cited

U.S. PATENT DOCUMENTS

| | | | | |
|---|---|---|---|---|
| 2,291,395 A | * | 7/1942 | Levey ................. | B23D 45/126 266/56 |
| 2,561,484 A | * | 7/1951 | Shaw ..................... | B23D 21/04 30/97 |
| 2,842,238 A | * | 7/1958 | Shaw ..................... | B23D 21/04 30/101 |
| 3,608,410 A | * | 9/1971 | Brownstein .......... | B23D 45/126 82/47 |
| 4,269,552 A | * | 5/1981 | Unigovsky .......... | B23D 79/021 409/140 |
| 4,490,909 A | | 1/1985 | Wachs et al. | |
| 5,815,926 A | * | 10/1998 | Ekern .................... | B23D 21/14 30/103 |
| 2004/0175247 A1 | * | 9/2004 | VanderPol ............. | B23C 3/34 409/132 |

FOREIGN PATENT DOCUMENTS

| | | |
|---|---|---|
| CN | 102814543 A | 12/2012 |
| CN | 203265762 U | 11/2013 |
| DE | 19611275 A1 | 12/1996 |
| DE | 20104912 U1 | 6/2001 |

* cited by examiner

*Primary Examiner* — Daniel W Howell
(74) *Attorney, Agent, or Firm* — Muncy, Geissler, Olds & Lowe, P.C.

(57) ABSTRACT

A pipe milling machine for separating and/or cutting a pipe to length is disclosed. In an embodiment the pipe milling machine includes a milling wheel configured to separate the pipe and a motor configured to generate a feed of the pipe milling machine and to drive the milling wheel, wherein driving the milling wheel is independent of separating the pipe.

11 Claims, 2 Drawing Sheets

US 10,207,346 B2

PIPE MILLING MACHINE—FEED DEACTIVATION

CROSS-REFERENCE TO RELATED APPLICATIONS

This application claims the priority of German patent application 10 2016 108 219.8, filed on May 3, 2016, and entitled "Pipe Milling Machine—Feed Deactivation", which application is incorporated herein by reference in its entirety.

TECHNICAL FIELD

The present invention is directed to a pipe milling machine for separating and/or cutting a pipe to length.

BACKGROUND

In the prior art pipe milling machines are known, which can be used for separating pipes. For this, the pipe milling machines are mounted onto the pipe, which is to be processed, and surround the pipe, so that a milling wheel can cut through the pipe wall.

SUMMARY

The cutting depth of a milling wheel has to be adjusted. Typically the cutting depth is adjusted in such a way, that the pipe wall is just cut through. A corresponding adjustment of the cutting depth should be done when the pipe milling machine is stationary, i.e. when the feed rate is zero. In the prior art the feed cannot be turned off. This results in the need to adjust the cutting depth during a moving pipe milling machine. For the machinist, who adjusts the cutting depth of the milling wheel, there is thus a not small risk of injury.

Embodiments of the present invention provide a pipe milling machine, which eliminates the risk of injury during adjustment of the cutting depth of the milling wheel.

In a first embodiment, a pipe milling machine for separating and/or cutting a pipe to length comprising: a device for generating a feed (or feed motion) of the pipe milling machine, a milling wheel for processing the pipe and a device for driving the milling wheel, wherein the device for generating the feed and the device for driving are operable independently from one another.

According to an exemplary embodiment of the invention, a pipe milling machine is provided, wherein, in a first operating condition of the pipe milling machine, there is no feed and a drive of the milling wheel is present.

According to a further embodiment of the invention, a pipe milling machine is provided, wherein, in a second operating condition of the pipe milling machine, there is a feed and no drive of the milling wheel is present.

According to a yet another embodiment of the invention, a pipe milling machine is provided, wherein, in a third operating condition of the pipe milling machine, there is a feed and a drive of the milling wheel is present.

By decoupling feed and drive of the milling wheel, a milling operation may be done, for example, locally limited in one location or the cutting depth of the milling wheel may be adjusted first, without the pipe milling machine moving around the pipe to be processed. This allows for comfortable handling of the pipe milling machine. Furthermore, risk of injury during adjustment of the cutting depth/plunging depth of the milling wheel is eliminated.

According to an exemplary embodiment of the invention, a pipe milling machine is provided, wherein a control of the pipe milling machine can be carried out with a lever, wherein in a first position of the lever the first operating condition is present and/or wherein in a second position of the lever the second operating condition is present and/or wherein in a third position of the lever the third operating condition is present.

In a further embodiment according to the invention, a pipe milling machine is provided, wherein the lever is rotatively turnable, whereby positions of plunger pins for control of a worm gear are changeable, wherein the worm gear serves for turning on or off the device for generating the feed.

By means of a rotative adjustability of the lever control of the pipe milling machine can be carried out, which can be achieved in a user friendly and space saving way.

According to a further exemplary embodiment of the present invention, a pipe milling machine is provided, wherein the device for generating the feed and the device for driving are drive-able by one electric motor.

The use of only one motor for driving the milling wheel and for generating the feed allows for a compact body of the pipe milling machine.

Various embodiments provide a device for a pipe milling machine in such a way that an adjustment of the cutting depth is possible without the pipe milling machine moving while the milling wheel is running. In particular, embodiments provide that an adjustment is possible without feed of the pipe milling machine while the milling wheel is running.

The individual features can, of course, also be combined with one another, as a result of which, in some cases, advantageous effects, which go beyond the sum of the individual effects, may result.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
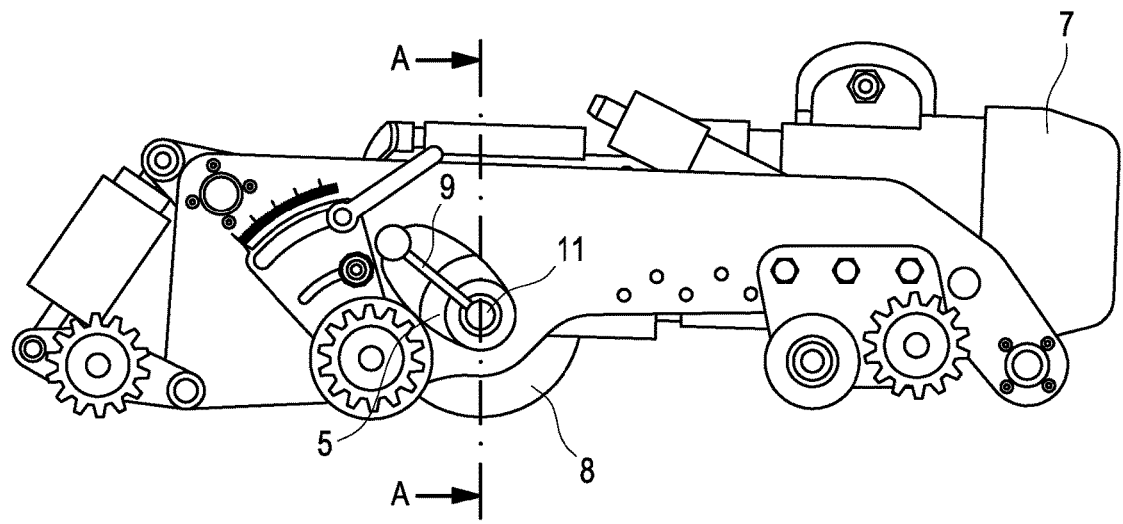
FIG. 1 a side view of a pipe milling machine according to the invention.

FIG. 1 shows a side view of a pipe milling machine having an electric motor 7 for driving a milling wheel 8, wherein the electric motor 7 additionally provides the feed for the pipe milling cutter. By means of the feed the pipe milling machine is moved around the pipe to be processed.

Figure 2:
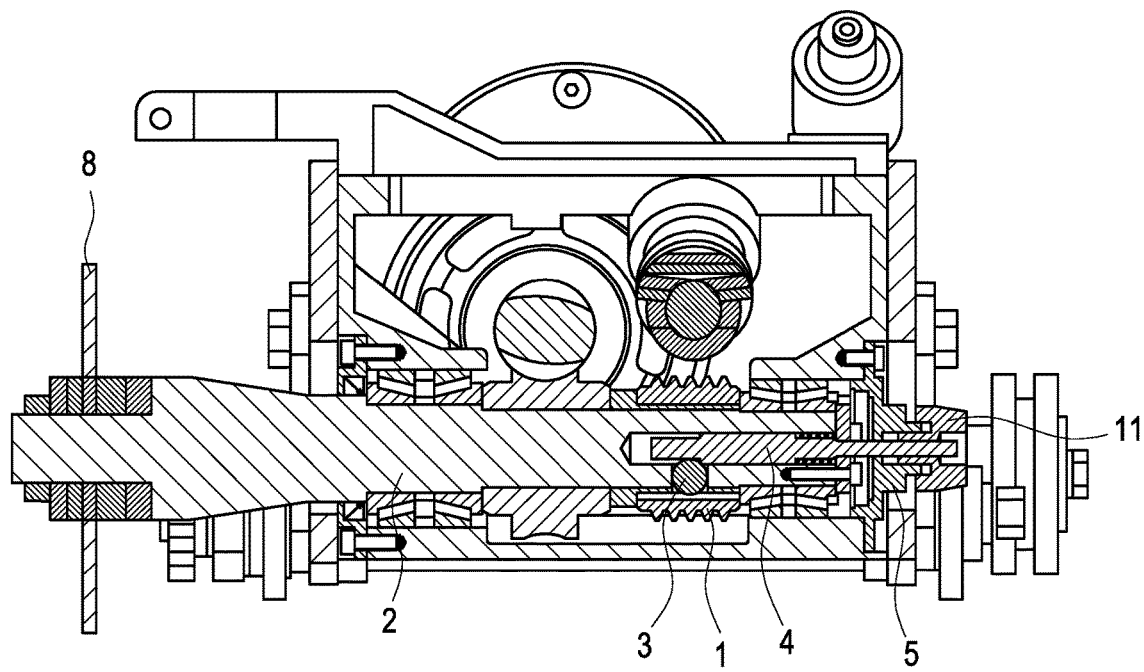
FIG. 2 a cross-section of the pipe milling machine.

FIG. 2 shows a cross-section through the pipe milling machine with the milling wheel 8 for separating and/or cutting to length. The pipe milling machine comprises a worm gear 1, which can be controlled in order to enable locking or releasing the feed. The worm gear 1 is arranged on the shaft 2 of the milling wheel 8. The worm gear 1 can be controlled via balls 3, namely with a switcher shaft 4 from the outside through a bearing cover 5. In this way, by rotative movement of a motion link 11 over cams, the feed is turned on or off corresponding to lock-in position.

Figure 3:
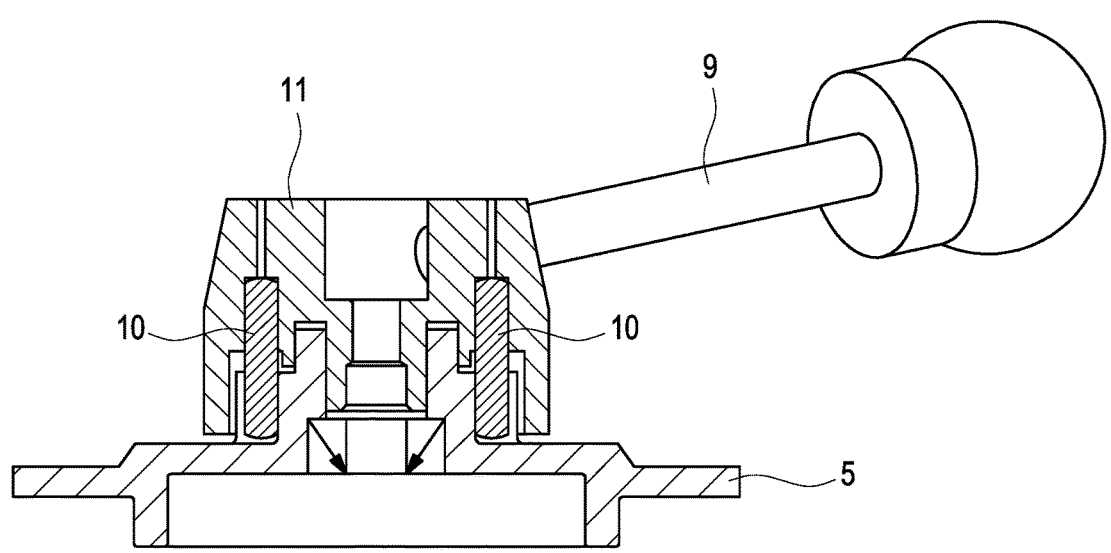
FIG. 3 a longitudinal section through a part of the pipe milling machine.

FIG. 3 shows a longitudinal section of a part of the pipe milling machine according to the invention having a bearing cover 5. The pipe milling machine is characterized by the fact, that a drive of the milling wheel 8 is possible without the presence of a feed. In this way a milling process may be done on a pipe without the pipe milling cutter moving around the pipe. Hereby a locally limited milling process may be done, for example locally limited to a location, where correction of a welding seam is to be done. In an alternative embodiment, additionally or alternatively, feed of the pipe milling machine may be achieved without driving the milling wheel. In a further alternative embodiment drive of the milling wheel and of the pipe milling machine, also called feed, may be set simultaneously. Furthermore each drive may be adjusted individually. A setting of the drive mode may be achieved via motion link. Thereby the position of plunger pins 10 is controlling the set drive mode. The position of the plunger pins 10 can be changed via a lever 9. For this the lever 9 is rotatively moved, in order to change a position of the plunger pins 10.

It should be noted that the term "comprising" does not preclude further elements or process steps as the term "a" and "one" does not preclude several elements and steps.

The reference numerals used are merely for the purpose of increasing the intelligibility and should in no way be considered as limiting, the scope of the invention being reproduced by the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

LIST OF REFERENCE NUMERALS 1 worm gear
2 milling shaft
3 ball
4 switching shaft
5 bearing cover
6 gear lever
7 pressure spring
8 milling wheel
9 lever for manual switching
10 plunger pins
11 motion link

What is claimed is:

1. A pipe milling machine for separating a pipe to a length, the pipe milling machine comprising:
    a device for generating a feed of the pipe milling machine;
    a milling wheel for processing the pipe;
    a device for driving the milling wheel, wherein the device for generating the feed and the device for driving the milling wheel are independently operable from one another; and
    a lever configured to control the pipe milling machine, wherein the lever is rotatively turnable, so that positions of plunger pins and balls for controlling of a worm gear are changeable, the worm gear being configured to turn on or off the device for generating the feed,
    wherein the worm gear is arranged on a milling shaft of the milling wheel,
    wherein a switcher shaft, axially adjustable by the lever via a motion link, is provided and acts on the balls, the balls being mounted radially adjustable in the milling shaft to couple or decouple the milling shaft and the worm gear to turn on or off the device for generating the feed.

2. The pipe milling machine according to claim 1, wherein, in a first operating condition of the pipe milling machine, there is no feed generated but a drive of the milling wheel is present.

3. The pipe milling machine according to claim 2, wherein, in a second operating condition of the pipe milling machine, there is a feed generated and a drive of the milling wheel is present.

4. The pipe milling machine according to claim 3, wherein, when the lever is in a first position, the first operating condition is present, and/or wherein, when the lever is in second position, the second operating condition is present.

5. The pipe milling machine according to claim 1, wherein the device for generating the feed and the device for driving the milling wheel are driveable by a single electric motor.

6. A pipe milling machine for separating a pipe to a length, the pipe milling machine comprising:
    a milling wheel configured to separate the pipe;
    a lever configured to control the pipe milling machine; and
    a motor configured to:
        generate a feed of the pipe milling machine; and
        drive the milling wheel,
    wherein driving the milling wheel is independent of generating the feed of the pipe milling machine, and
    wherein the lever is rotatively turnable, so that positions of plunger pins and balls for controlling of a worm gear are changeable, the worm gear being configured to turn on or off the generation of the feed,
    wherein the worm gear is arranged on a milling shaft of the milling wheel,
    wherein a switcher shaft, axially adjustable by the lever via a motion link, is provided and acts on the balls, the balls being mounted radially adjustable in the milling shaft to couple or decouple the milling shaft and the worm gear to turn on or off the device for generating the feed.

7. The pipe milling machine according to claim 6, wherein, when the lever is in a first position, the motor does not provide a feed motion while driving the milling wheel, and wherein, when the lever is in a second position, the motor provides the feed motion while driving the milling wheel.

8. The pipe milling machine according to claim 1, wherein the plunger pins are disposed within the motion link that is connected to the lever.

9. The pipe milling machine according to claim 8, wherein the motion link is connected to a bearing cover.

10. The pipe milling machine according to claim 6, wherein the plunger pins are disposed within the motion link that is connected to the lever.

11. The pipe milling machine according to claim 10, wherein the motion link is connected to a bearing cover.

* * * * *